United States Patent Office 3,193,104
Patented July 6, 1965

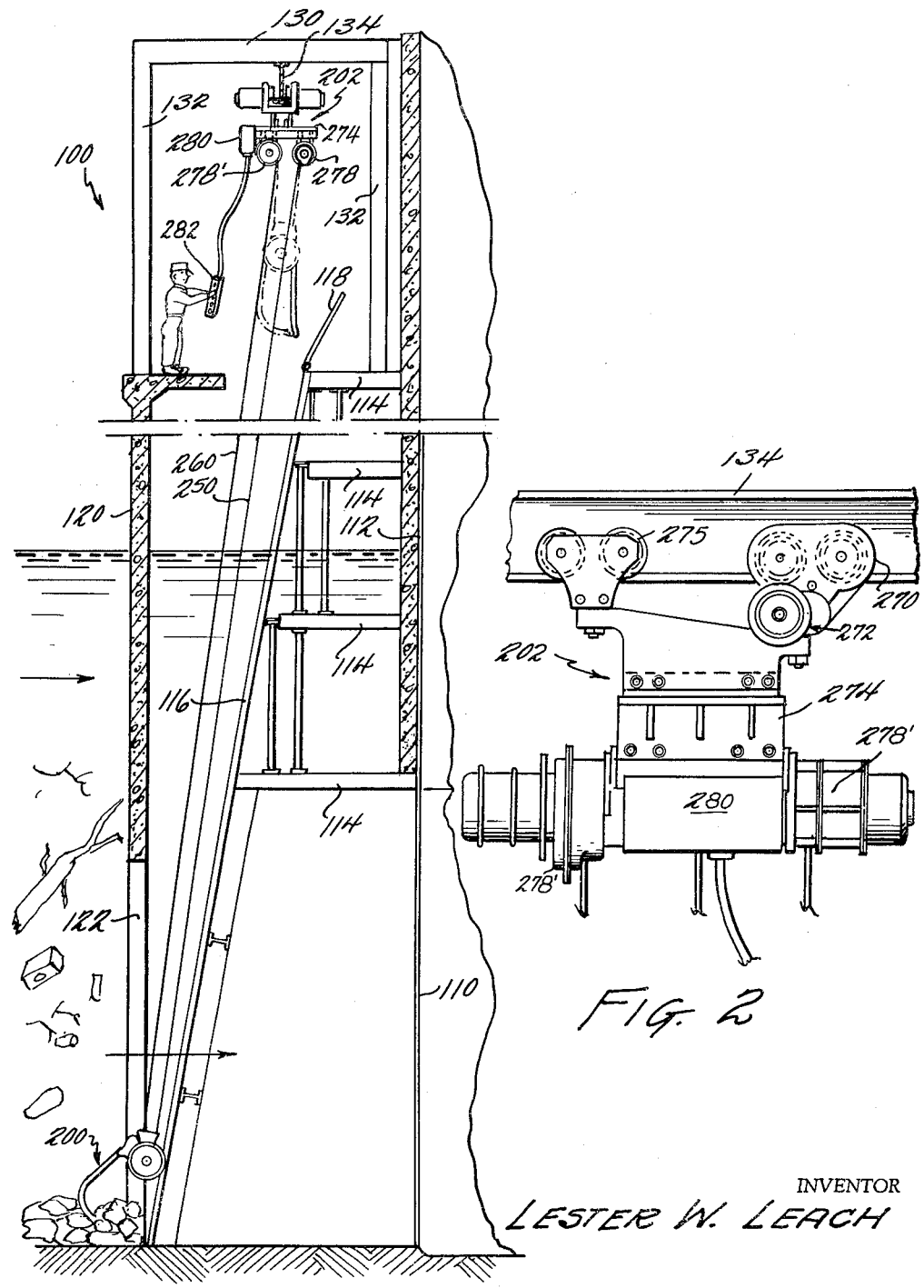

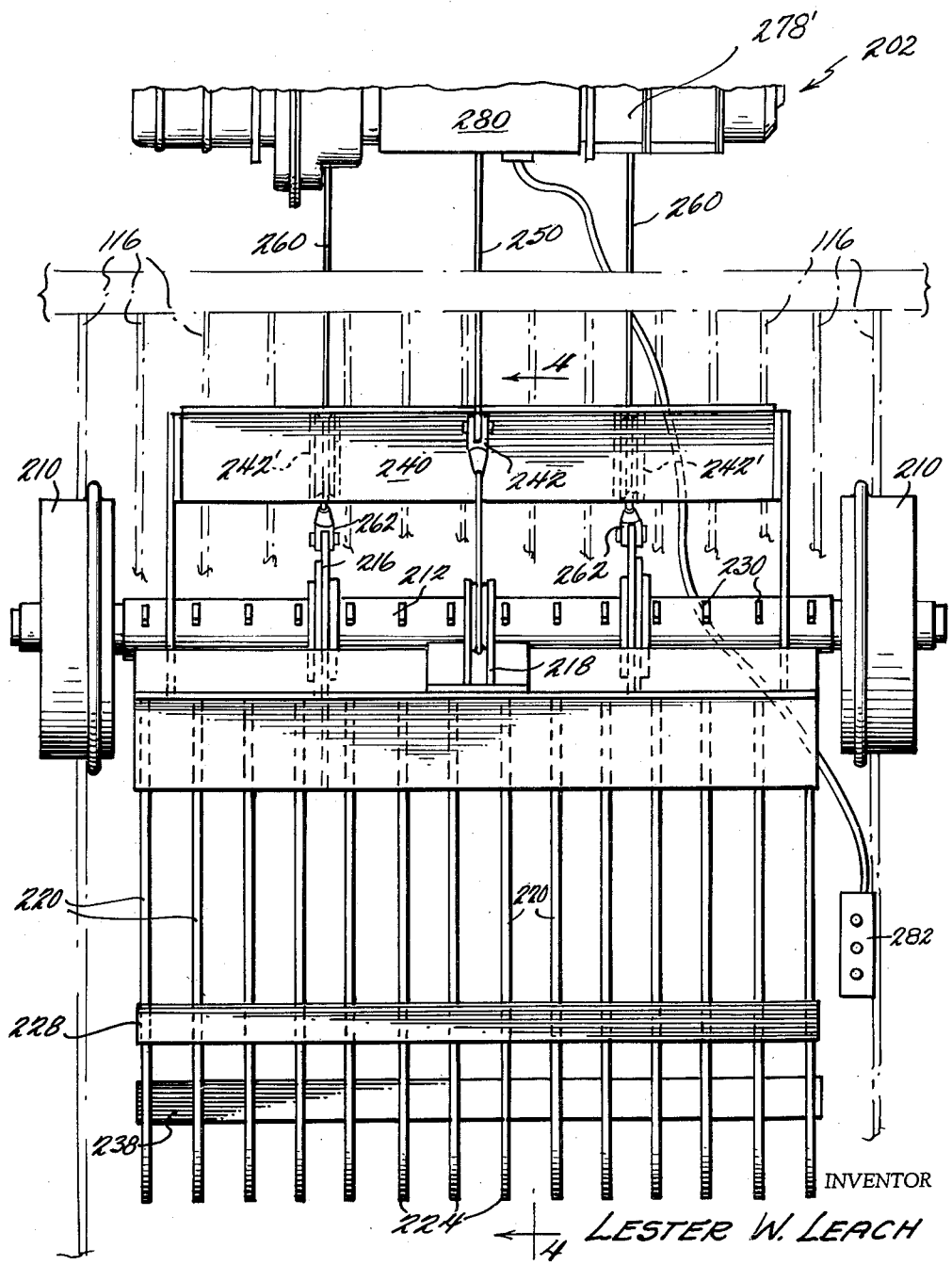

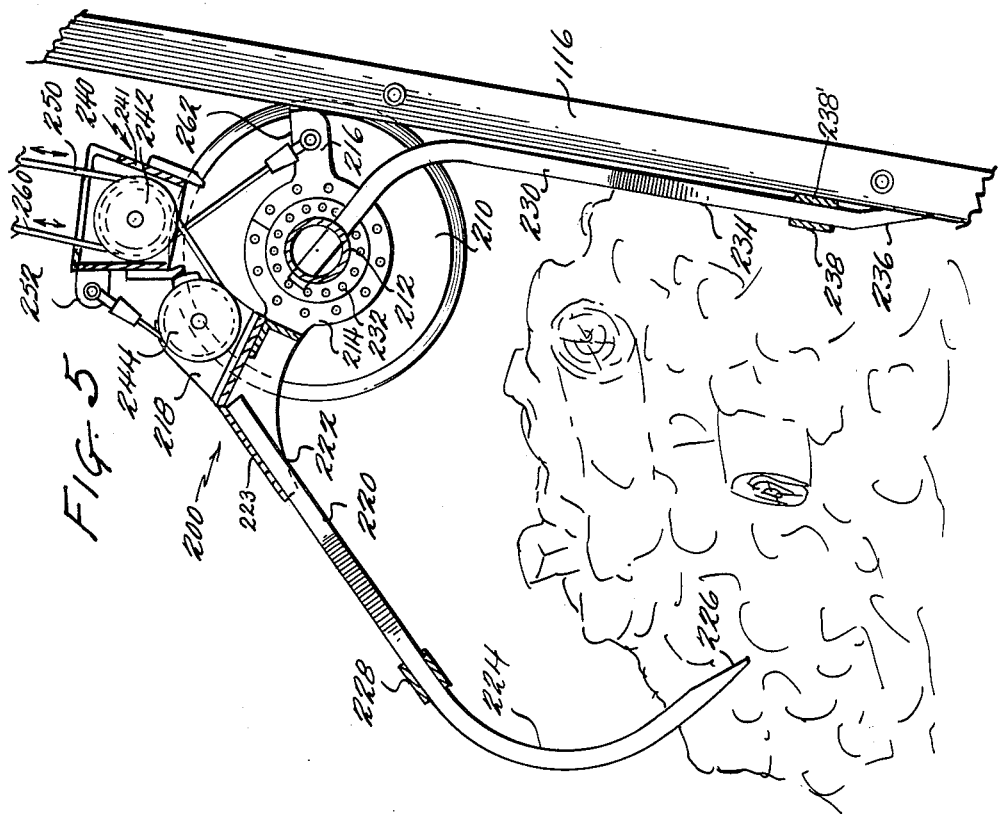
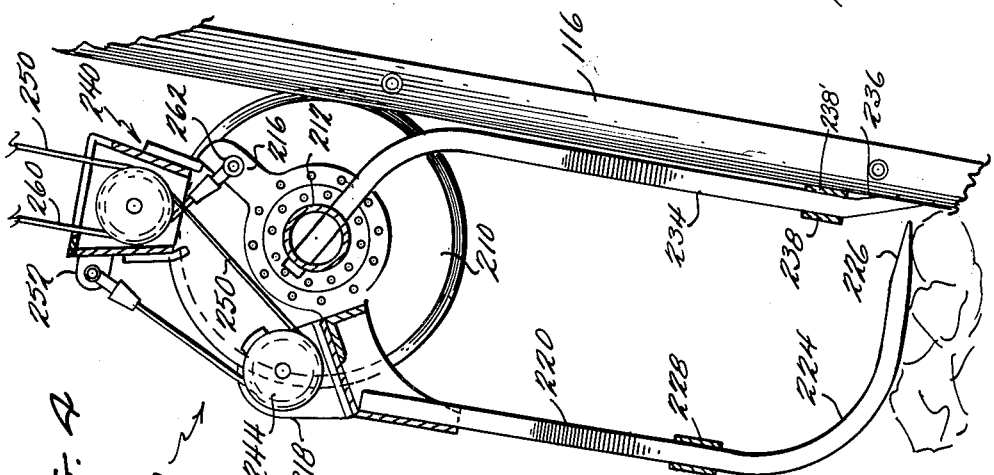

3,193,104
POWER OPERATED TRASH FORK FOR
HYDRAULIC INTAKE STRUCTURES
Lester W. Leach, 2225 Glen Ellyn, Oklahoma City, Okla.
Filed Jan. 26, 1961, Ser. No. 85,139
4 Claims. (Cl. 210—162)

The present invention relates to means for removing collections of debris and the like from trash racks, screens and grills at hydraulic intakes.

More especially, the invention is directed to means for physically removing accumulated trash and the like from screens and grills, which may be disposed upstream of a moving body of water. The invention is useful particularly in connection with industrial and municipal installations, where water may be withdrawn from river, lake or comparable bodies of water, for use as a circulating and cooling medium as in steam-electric power plants, in water supplying works for municipalities, in processing water for chemical plants, for hydroelectric power plants, for lumbering and paper mill operations. In such usage it is required that objectionable precipitate or suspended driftwood, vegetable and accumulated impurities whether floating, suspended or sunk be removed from the water prior to finer filtration and use as aforesaid.

Problems incident to the removal of such impurities and debris include overcoming the strong currents, forcing the debris against the screen during efforts of removal and the fact that the effort of removal requires sub-marine access to the materials. Furthermore, to remove debris by hand is a time-consuming, hazardous and not altogether successful process in view of the climatic and great pressure and forces involved in large bodies of water, portions of which are conducted from the large body for the purposes mentioned. In such operations, debris including trash, logs and the like are often completely submerged, and therefore, invisible to the operator.

Typical of the uses of the invention include the trash-handling facilities for a screen house at a river intake. Here automatic means are devised for opening and closing a grappling device by application of power through steel cables actuated by double electric or mechanical winch. One may thus compact and keep under close control any load withdrawn from the upstream side of the conduit adjacent the screen thereof. Conventionally, loose trash of this type is dragged upward of a screen by engaging teeth into the mass of the trash from somewhere beneath the top of the accumulation, whereas the present invention is adapted to the compacted removal of trash or debris from the top of the lodged accumulation. In practice, this system prevents loss through the screen into plant intake.

Basically, the device consists of two matched sets of uniquely shaped tines arranged to open apart and close together in hinge-like fashion by application of power to a suitable mechanism at their upper extremities. When open, the tines form a grappling fork; when closed, they constitute a spacious and rigid receptacle for holding and removing trash and debris from the upstream face of a fixed trash screen. In order to withstand strong currents, support for the device against the fixed screen is provided by wheels at the upper extremity of the tines and by a cross bar or shoe attached to the lower extremity of the rear tines.

It is therefore an object of the invention to provide means for automatically compacting and removing trash and debris from the upstream side of hydraulic intakes and the like, wherein a progressive top to bottom removal may be effected without danger of losing lodged debris to the intake of the conduit.

A further object of the invention includes means for the facile removal and transfer of accumulated surface and sub-surface debris at the situs of accumulation.

These and further objects will be apparent from the ensuing description and claims, wherein:

FIG. 1 is a view in side elevation of the invention system showing the general relation of fixed and moving parts to a conventional screen house, hydraulic intake;

FIG. 2 is an expanded view in fragment of the motive means for horizontal, vertical and opening and closing movement of the debris collecting instrument;

FIG. 3 is a view in front elevation of the debris collecting grappling element of the invention;

FIG. 4 is a sectional view of the grappling element described in FIG. 3, taken along the lines 4—4 thereof, showing the instrument closed.

FIG. 5 is likewise a sectional view of the grappling element of invention taken along the lines 4—4 of FIG. 3, illustrating the element as opened.

Referring to FIG. 1, there is shown the complete debris removal assembly 100 associated with a conventional conduit intake 110 submerged in a body of water, a portion of the body being conducted through the intake. The overall system herein described comprises a vertical wall 112 defining the intake 110 and lending support to a plurality of horizontally disposed rack-engaging frames 114. The rack of screen 116 is sloped downstream as is conventional. This screen 116 serves in the present instance to collect debris from the body of water as the current carries same in the direction of flow. Certain foreign objects will float to the water line contiguous the rack and others will precipitate and some will suspend. Atop the rack 116 is a conventional grating 118 hinged thereto for access to the screen. The screen house is further defined by a forward abutment 120 constructed in interconnection with the rear wall 112, the abutment 120 having an opening 122 adjacent the conduit intake 110 to provide conduit intake.

Framework of the assembly includes a plurality of transverse beams 130 supported at ends by the vertical uprights 132. Centrally of the supporting frame, I-beam guide 134 is provided to serve as a monorail transfer as will be more fully explained hereinafter. While the debris removal assembly 100 represents a typical installation details of auxiliary equipment and structure may be varied to suit particular installation conditions and requirements.

Crane assembly 202 includes motor driven trolley 270 and stabilizing trolley 275 as shown in FIGURE 2. Motor means for driving the trolley are broadly shown at 272. Double hoist hanger 274 depends from the trolleys. As is best shown in FIGURE 1, hoists 278 and 278' are mounted on hoist hanger 274. The respective hoists are provided with motive power by the electric motors shown and a suitable control panel 280 being provided adjacent the hoist motive means. Push button control 282 is connected electrically to the panel 280.

Referring now to FIGS. 3, 4 and 5, the trolley and hoists are interconnected to the grappling assembly by cables 250 and 260 respectively. The hoist 278' serves the cables 260 and the hoist 278 serves the single power cable 250. The grappling assembly is suitably wheel-mounted upon a fixed axle 212 engaging the respective wheels 210, said axle having fixed contact with ends of tines 230 of the lower portion of the grappling device, to fix same against arcuate movement during operation.

The grappling devices 200 include a plurality of movable tines 220 spaced in parallel relation and pivoted to move arcuately about the axle 212 by mounting means 232, ring-like member 214, and plate 233 as shown in FIGS. 4 and 5. To secure the respective tines in spaced relation, plates 228 are welded intermediate ends of the tines 220, said tines being secured at one end 222 by weldment to a common plate adjoining the ring-like member or pivot 214, curved by bending upon themselves at 224 to terminate in bevelled teeth 226 as shown. The counterpart tines 230 are likewise secured in spaced relation at one end by axle and the other by welded plates or crossbars 238 and 238'. Ends of the tines 230 project through and anchor to the axle 212, as will be apparent. The shank 234 of the respective tines terminate at 236 by bending outwardly, the bevel for the respective tines being disposed inwardly, as shown.

In order to maintain the device in efficient operating attitude with respect to the upstream face of the fixed screen 116, wheels 210 are rotatably attached to the ends of the cylindrical shaft 212. Cross bar 238' is rigidly welded to the back face of the lower extremity of rear tines 230, as shown in FIGURE 4 and FIGURE 5.

Wheels 210 are of such suitable diameter that they serve the double purpose of providing rolling contact and support against the upstream face of the fixed screen.

Cross bar 238' slides along the upstream face of fixed screen 116 as the device is raised or lowered, thus serving the double purpose of holding tines 230 in parallel relationship with screen 116 and also preventing the collision of tines 230 with cross bolts which interconnect the plurality of bars in fixed screen 116.

A suitable arrangement of cables 250 and 260, and sheaves 242 and 244, enclosed in the housings 240 and 218, is provided for rotating the front set of tines arcuately about shaft 212 as the center of rotation, thus allowing the receptacle to be opened or closed at the discretion of the operator by the application of power to the cables 250 and 260.

All of this operating mechanism is located above and entirely outside the limits of the receptacle, thus uniquely providing assurance that the operating mechanism cannot be fouled by an overload of trash, and also that when the receptacle is opened to its full width all trash will readily fall out due to its own weight without requiring any auxiliary cleaning or unloading devices.

The pulley system 241 includes a transversely disposed central sheave 242 journalled within the housing 240, said housing being appropriately connected to the axle 212. The sheave 242 provides a lifting fulcrum to accommodate the cable 250 (anchored at 252) in opening moment applied to the tines 220 by means of sheave 244 in drawing the assembly 220 ever closer to the extreme open position shown in FIG. 5. It will be noted from reference to FIG. 3 that the pulley system includes outer sheaves 242' accommodating the respective cables 260 anchoring in crank or lug 216 to effect closing of the tines 220 (FIG. 4).

*Operation*

In operation, the operator will have push button control to transfer the loaded or unloaded grapple by trolley from point of pick up to point of deposit. These same controls direct the raising, lowering, opening and closing of the grapple or power operated trash fork. As previously indicated, the winches which hoist also serve to open and close the grapple. The winches are synchronized to permit as in closing an idling moment to cable 250 while tension is applied to the cables 260. In opening, an idle or slackening is applied to the cables 260 as the cable 250 is winched upward whereupon by further and braked relaxation of tension on the cables 260, the grapple may be lowered as it rides downward along the rack 116. Releasing the brake of winch accommodating cable 250 now permits closure of the grapple as cable 260 is tensed and the load raised whereupon a continuous tension and powerful registry of opposed tines 220 is applied against the load.

Whereas the invention has been described with reference to hydraulic submerged systems, it will be apparent that it may be adapted to other and related fluid transfer systems where problems of precipitate and waste disposal may arise. The invention thus bears the scope of the appended claims.

I claim:
1. In a device for the transfer of accumulated debris, the improvement in a combination comprising:
   a static screen disposed in a continuous flow path of a debris contaminated fluid;
   a debris grappling system operably associated with the screen including debris grappling means reciprocably movable along an upstream face of the screen, and first and second power means for opening and closing said grappling means, and for reciprocably moving said grappling means with respect to said screen, said grappling means including
   a horizontally oriented axle,
   first and second wheels rotatably mounted on opposite ends of said axle, said wheels engaging the upstream face of said screen and maintaining said axle spaced parallel to said screen,
   a plurality of fixed tines having free ends and having fixed ends, said fixed ends being fixedly secured to said axle between said wheels, said fixed tines extending radially from said axle, uniformly turning and extending substantially parallel to said screen adjacent the upstream face thereof,
   a first horizontal plate interconnecting said free ends of said fixed tines,
   at least one ring-like member,
   mounting means rotatably supporting said at least one ring-like member on said axle,
   a second plate fixed to said ring-like member and extending therefrom generally radially,
   a plurality of movable tines having first ends fixed to said second plate spaced from said ring-like member and having second ends curving toward said free ends of said fixed tines,
   means connected to said fork and to said first power means for opening said fork,
   flexible means connected to said grappling means and to said second power means, whereby actuating said second power means closes said grappling means and continued actuating of said second power means raises said grappling means.

2. The improvement of claim 1 additionally comprising at least one lug radially extending from said at least one ring-like member oppositely of said second plate, and wherein said flexible means comprises at least one cable secured to said at least one lug and operatively connected to said second power means.

3. In a device for the transfer of accumulated debris, the improved combination of:
   a fixed screen within the channel of a moving body of water;
   a grappling system adapted to reciprocal movement over an upstream face of said screen;
   a track spaced vertically over said screen;
   a trolley including rollers riding said track;
   motive power means supported by said trolley;
   a fork suspended from said motive power means, said power means reciprocating said fork over said screen, lifting said fork from said screen and selectively opening and closing said fork, said fork including an horizontal axle,
   first and second screen engaging wheels rotatably mounted on opposite ends of said axle, spacing said axle parallel to said screen,
   a fixed jaw comprising fixed tines having fixed ends secured in said axle, and having free ends remote from said fixed ends, said tines extending radially from said axle, uniformly turning, and extending substantially parallel to said screen adjacent the upstream face thereof, said fixed jaw abutting said screen and being movable between said debris and said screen,
   a movable jaw including
      at least one ring-like member, mounting means rotatably supporting said at least one ring-like member on said axle,
a second plate fixed to said ring-like member and extending therefrom generally radially,
a plurality of movable tines having first ends fixed to said second plate spaced from said ring-like member and having second ends curving toward said free ends of said fixed tines,
means connected to said fork and to said power means for opening said fork, and
flexible means connected to said fork and to said power means, whereby actuating said power means closes said fork, and continued actuating of said power means raises said fork.

4. The improvement of claim 3 additionally comprising at least one lug radially extending from said ring-like member oppositely of said second plate, and wherein said flexible means comprises at least one cable secured to said at least one lug and operatively connected to said power means.

References Cited by the Examiner

UNITED STATES PATENTS

| | | | |
|---|---|---|---|
| 1,392,647 | 10/21 | Jones | 210—159 |
| 2,784,845 | 3/57 | Sturzenegger | 210—154 |
| 2,904,181 | 9/59 | Baker et al. | 210—159 |

FOREIGN PATENTS

| | | |
|---|---|---|
| 754,083 | 8/33 | France. |
| 376,003 | 5/24 | Germany. |

REUBEN FRIEDMAN, *Primary Examiner.*

HERBERT L. MARTIN, GEORGE D. MITCHELL,
*Examiners.*